(12) United States Patent
Cheng et al.

(10) Patent No.: US 7,474,025 B1
(45) Date of Patent: Jan. 6, 2009

(54) MAIN SHAFT CLEARANCE ELIMINATING STRUCTURE FOR A DIRECT DRIVE TORQUE MOTOR

(75) Inventors: Fu-Yuan Cheng, Taichung (TW); Chih-Hsien Chao, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 0 days.

(21) Appl. No.: 11/833,980

(22) Filed: Aug. 4, 2007

(51) Int. Cl.
*H02K 5/16* (2006.01)
*H02K 7/08* (2006.01)

(52) U.S. Cl. .................................................. 310/90
(58) Field of Classification Search ............... 310/90, 310/67 R, 86, 323.17
See application file for complete search history.

(56) References Cited

U.S. PATENT DOCUMENTS 5,166,566 A * 11/1992 Bernhardt et al. ........... 310/90.5
2008/0164773 A1 * 7/2008 Wang ........................... 310/54

* cited by examiner

*Primary Examiner*—Hae Moon Hyeon
(74) *Attorney, Agent, or Firm*—Banger Shia

(57) ABSTRACT

A clearance eliminating structure for a shaft of a direct drive torque motor comprises: a body, a direct drive torque motor, a bearing assembly and an adjustment nut. The main shaft includes a plurality of stages which are used to positioning the torque motor and the bearing assembly, and then torque motor and the bearing assembly are used to position the body. The main shaft is formed at the end with threads for enabling the adjustment nut to press tightly against the respective components on the main shaft. When the present invention is used on the assembly of the direct drive torque motor, which can not only simplify the assembly operation, improve the reliability, but also eliminate the clearance of the main shaft to increase the service life of the product.

5 Claims, 5 Drawing Sheets

MAIN SHAFT CLEARANCE ELIMINATING STRUCTURE FOR A DIRECT DRIVE TORQUE MOTOR

BACKGROUND OF THE INVENTION

1. Field of the Invention

The present invention relates to a clearance eliminating structure for a direct drive torque motor, and more particularly to a main shaft clearance eliminating structure for a direct drive torque motor, which can be used on the direct drive torque motor to simplify the assembly operation, improve the reliability of the motor, and it can eliminate the clearance of the main shaft to increase the service life of the product.

2. Description of the Prior Art

The motors are used more and more widely in modern industries, and are generally categorized into external rotor, internal rotor and so on. In addition to the high precision in the feeding transmission, the motor also has the advantages of low friction loss, high energy conversion efficiency and low noise, etc. Hence, the motor is obviously important to the modern industrial tool machines.

The existing direct drive motors are applied to the drive of the axis equipments, such as the automatic equipment, the indexing plate and each kind of tool machine. With reference to FIGS. 1 and 2, a clearance eliminating structure for the main shaft of a conventional direct drive torque motor utilizes the coil 101 of an outer stator 10 to closely cooperate with the magnet 111 of the inner rotor 11. A shaft 12 is fixed in the center of the inner rotor 11. The outer stator 10 includes an annular base 102, an annular aluminum sheet 103, a silicon steel sheet 104 and the coil 101 that are arranged sequentially from the outer to the inner periphery of the outer stator 10. A helical water passage 1031 is formed around the annular aluminum sheet 103, and a cooling water circulating hole 1021 is defined in the annular base 102. Thought it has been brought into use, this clearance eliminating structure for the main shaft of the conventional direct drive torque motor still has the following disadvantages:

First, this conventional direct drive torque motor must be mounted on a machine to carry out rotating operation and is not adapted for modular application since its heavy body is undetachable. Further, the market is awaiting new products which can be easily and independently used for various angle controlling, rotation speed controlling and precision controlling.

Second, if the conventional direct drive torque motor is mounted on a machine to carry out rotating operation, there are no appropriate assemblies that can be used to support and clamp the inner rotor 11 and the shaft 12 of the conventional direct drive torque motor, as a result, when the shaft 12 rotates, it will produce a clearance with respect to other components. This kind of shaft clearance will cause abrasion of the components, noise, and will considerably affect the life of the product.

Third, after the inner rotor 11 and the shaft 12 operated for a certain period of time, the clearance between them will become worse and worse due to the influence of deformation and abrasion. And the clearance of the shaft 12 will increase the abrasion and the noise of the respective components, and will considerably affect the life of the product.

The present invention has arisen to mitigate and/or obviate the afore-described disadvantages.

SUMMARY OF THE INVENTION

The primary objective of the present invention is to provide a main shaft clearance eliminating structure for a direct drive torque motor, which can eliminate the clearance of the main shaft and increase the life of the product.

To achieve the above objective, the main shaft includes a plurality of stages which are used to positioning the torque motor and the bearing assembly, and then torque motor and the bearing assembly are used to position the body. The main shaft is formed at the end with threads for enabling the adjustment nut to press tightly against the respective components on the main shaft. By such arrangements, when the present invention is used on the assembly of the direct drive torque motor, which can not only simplify the assembly operation, improve the reliability, but also eliminate the clearance of the main shaft to increase the service life of the product.

The secondary objective of the present invention is to provide a main shaft clearance eliminating structure for a direct drive torque motor which is simplified in terms of structure and assembly procedure.

To achieve the above objective, the main shaft includes a plurality of stages which are used to positioning the torque motor and the bearing assembly, and then the torque motor and the bearing assembly are used to position the body. The main shaft is adjusted to press tightly against the respective components on the main shaft. Therefore, the assembly operation is not only simplified but also the assembly reliability is improved.

In addition, a brake assembly is disposed between the body and the main shaft, a cooling assembly is disposed in the body to cool the torque motor (such as water cooled motor-cooling seat), and a position sensing is fixed on the body for sensing rotating position of the main shaft.

The brake assembly can be the pressure cylinder disposed between the body and the main shaft, and the pressure cylinder is used to apply pressure to the main shaft to carry out a braking action. The above brake technique is one of the embodiments of the present invention.

Since the present invention is detachable and adapted for modular application, the quantity and position of the bearings and bear seats between the body and the main shaft have no relation to the characteristic of the present invention. The present invention can use bearings and bearing seats of different sizes and different types, such as the general roller bearing or rolling ball bearing.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
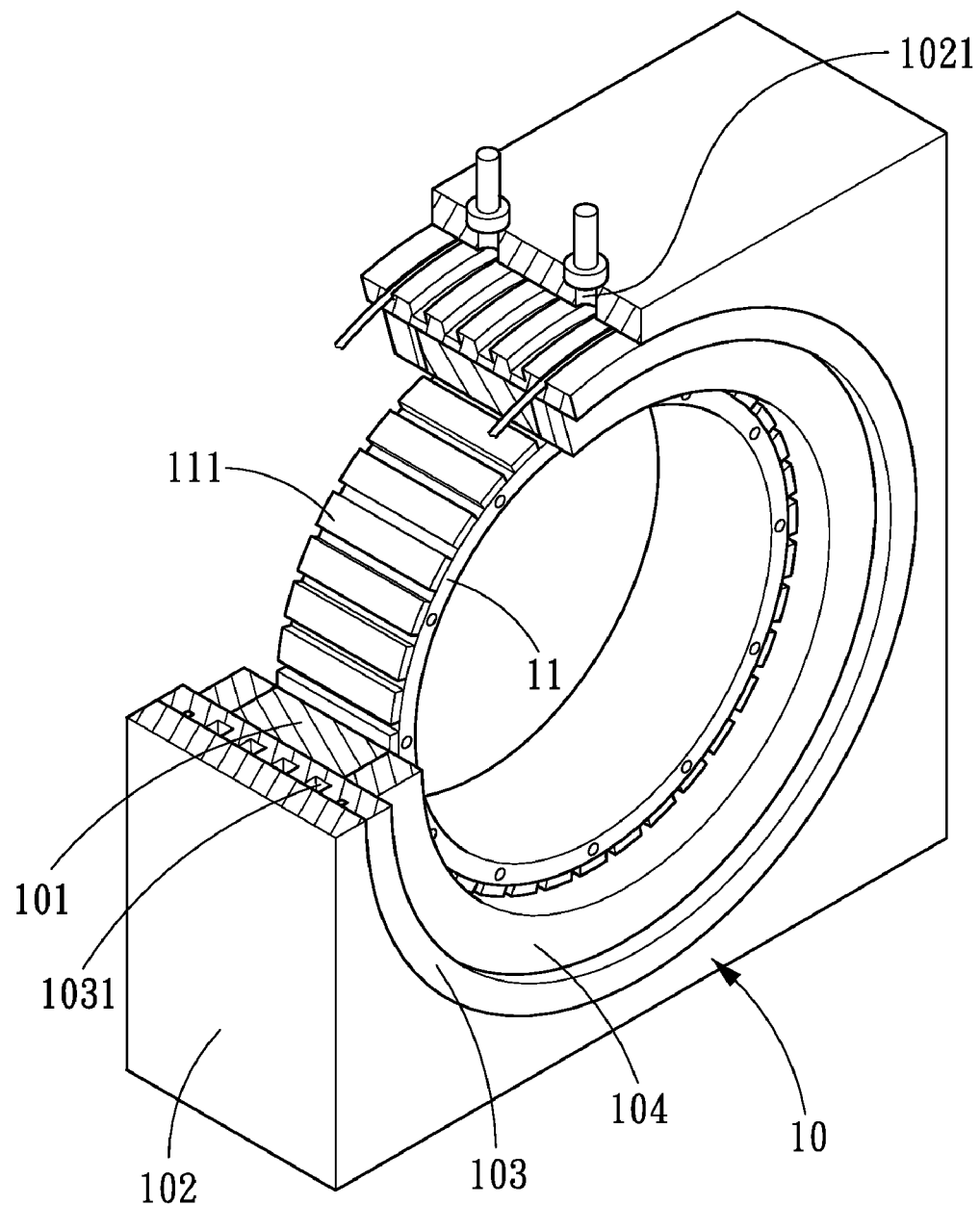
FIG. 1 is a cross sectional view of a part of a conventional direct drive torque motor.
Figure 2:
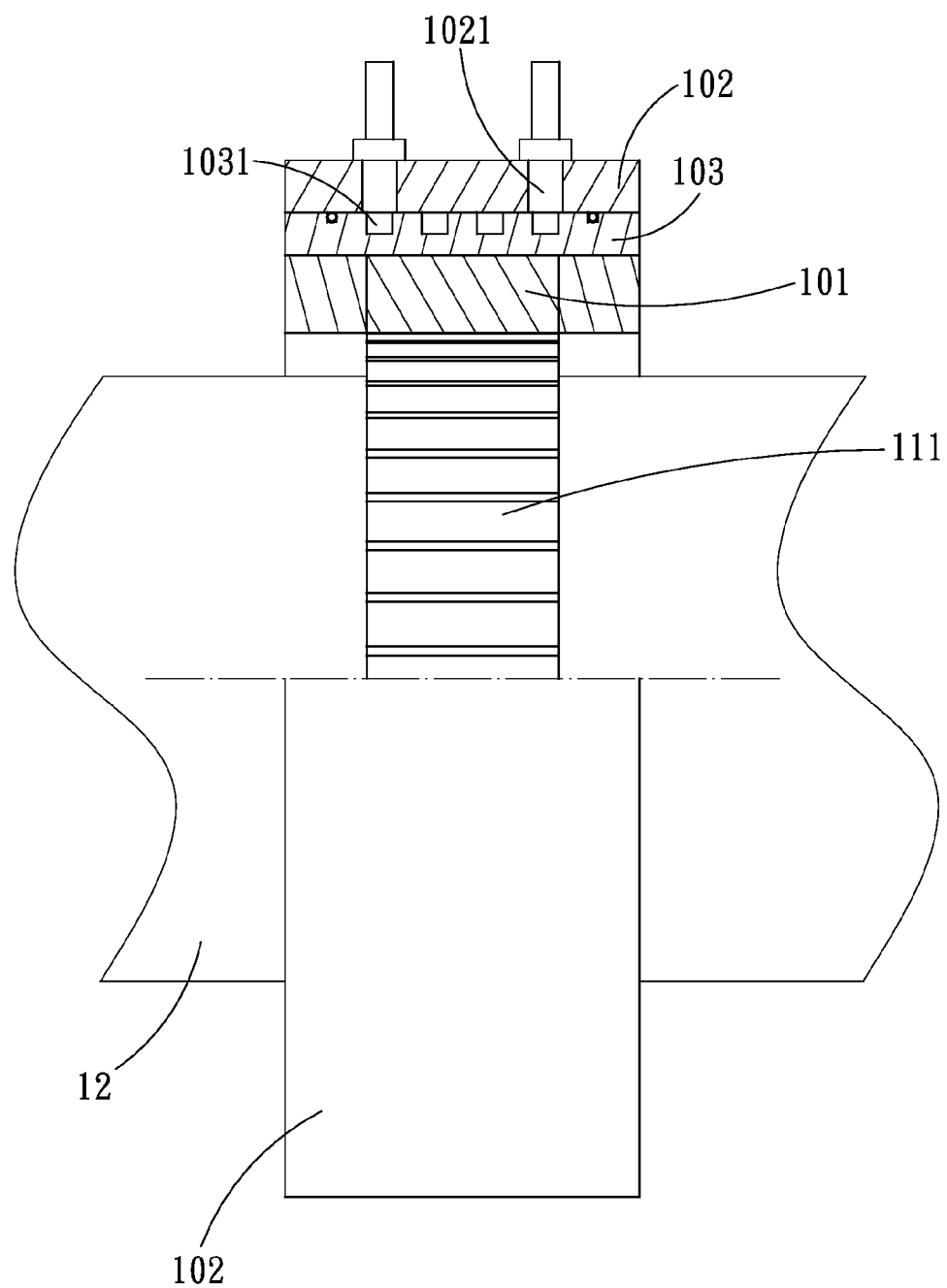
FIG. 2 is another cross sectional view of a conventional direct drive torque motor.
Figure 3:
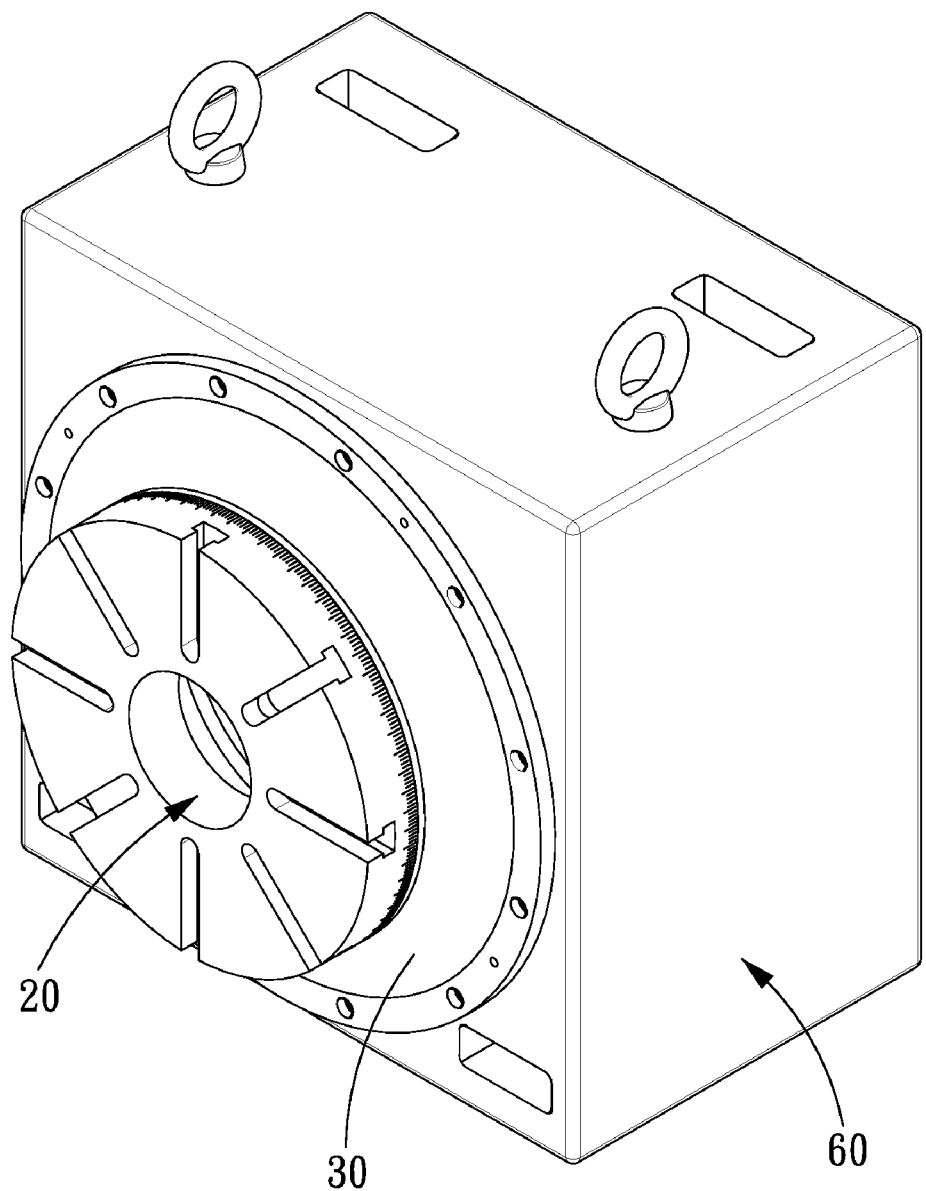
FIG. 3 is a perspective view of a main shaft clearance eliminating structure for a direct drive torque motor in accordance with the present invention.
Figure 4:
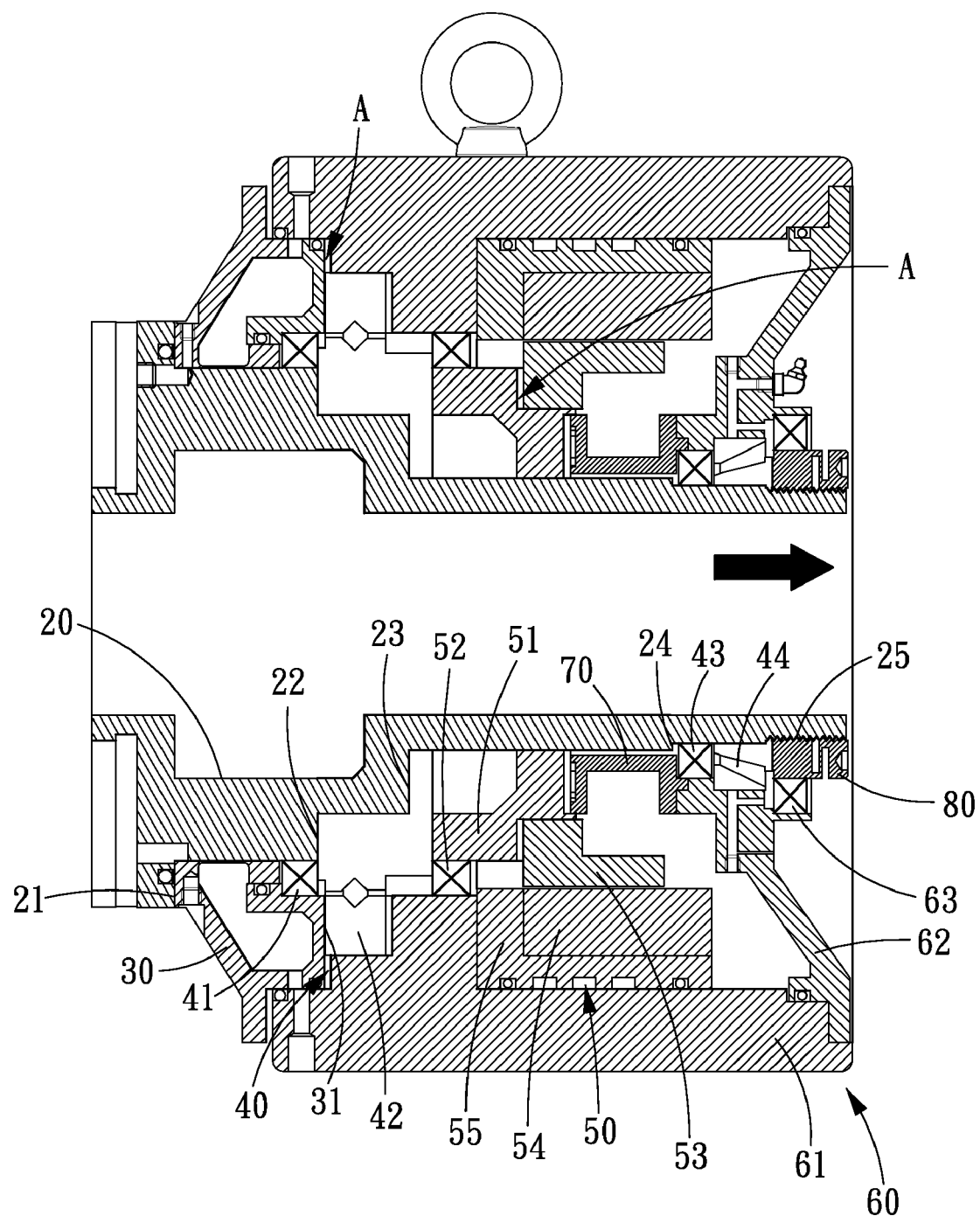
FIG. 4 is a cross sectional view in accordance with the present invention of showing the clearances of the main shaft clearance eliminating structure for a direct drive torque motor.
Figure 5:
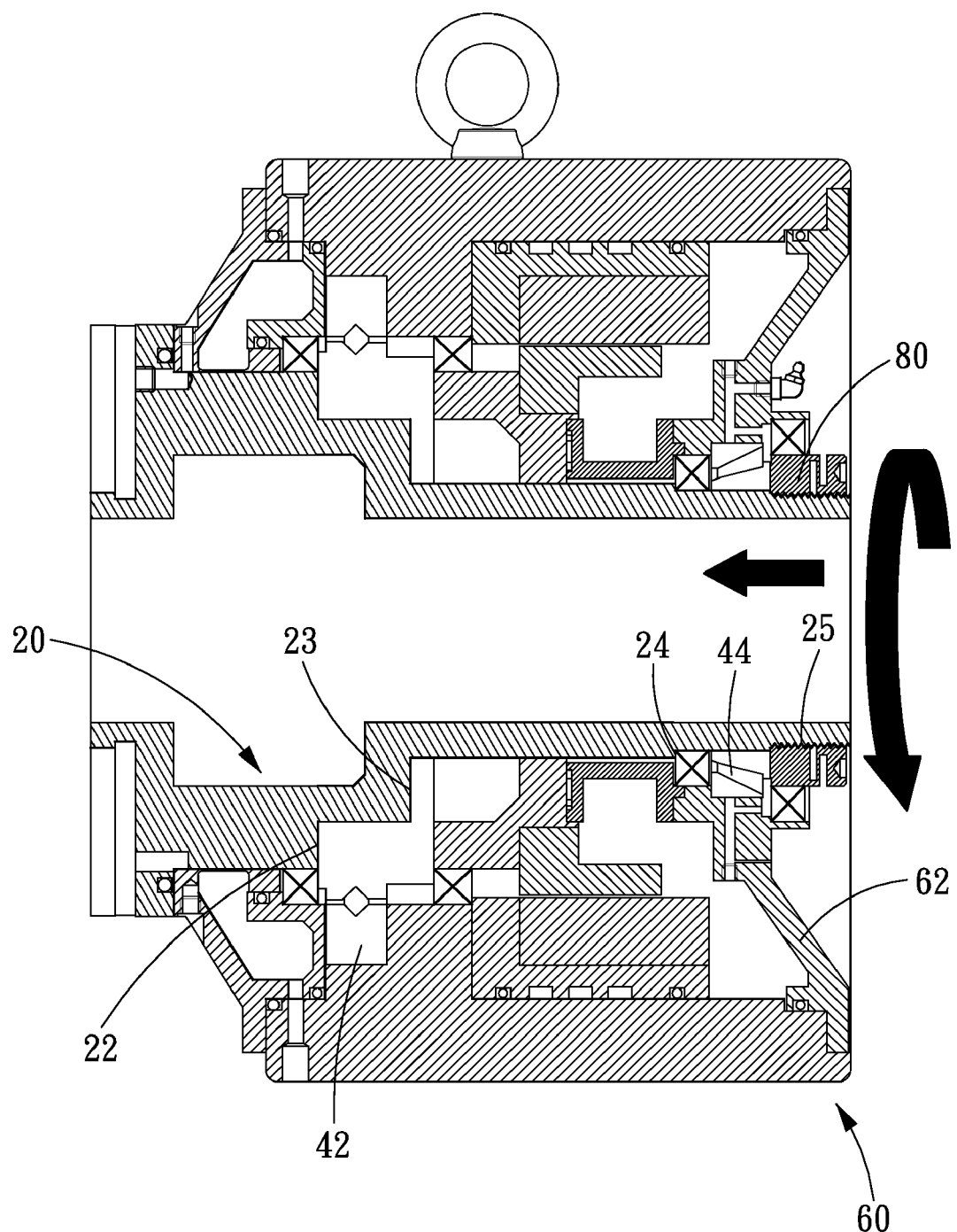
FIG. 5 is a cross sectional view in accordance with the present invention of showing that clearances of the main shaft clearance eliminating structure for a direct drive torque motor are eliminated.

Referring to FIGS. 3-5, a main shaft clearance eliminating structure for a direct drive torque motor in accordance with the present invention comprises: a main shaft 20, a brake assembly 30, a bearing assembly 40, a direct drive torque motor 50, a body 60, a position-sensing assembly 70 and an adjustment nut 80.

The outer surface of the main shaft 20 includes a first stage 21, a second stage 22, a third stage 23, a fourth stage 24 and an external thread segment 25 that are successively tapered from one end to the other end of the main shaft 20. The external thread segment 25 is formed at one end of the main shaft 20.

The inner side of the brake assembly 30 is positioned against the first stage 21 of the main shaft 20, and the outer side of the brake assembly 30 includes a positioning portion 31.

The bearing assembly 40 includes a first oil seal 41, a main bearing 42, a second oil seal 43 and an assistant roller bearing 44. The first oil seal 41 is disposed between the brake assembly 30 and the main shaft 20. The main bearing 42 is located on the second stage 22 of the main shaft 20 and positioned against the brake assembly 30. The second oil seal 43 is located on the third stage 23 of the main shaft 20. The assistant roller bearing 44 is a tapered roller bearing which is located on the fourth stage 24 and abuts against second oil seal 43.

The direct drive torque motor 50 includes a mover-fixing seat 51, a mover oil seal 52, a mover 53, a stator 54 and a motor-cooling seat 55. The mover-fixing seat 51 is positioned against one side of the main bearing 42 of the bearing assembly 40. The mover oil seal 52 and the mover 53 are fixed outside the mover-fixing seat 51. The stator 54 is fixed in the motor-cooling seat 55 and is mounted on the mover 53.

The body 60 includes a shell member 61, a rear cover 62 and a rear cover oil seal 63. The shell member 61 is fixed with the rear cover 62. One end of the body 60 is fixed with the positioning portion 31 of the brake assembly 30. The body 60 and the main shaft 20 are positioned by the main bearing 42 of the bearing assembly 40. The rear cover 62 of the body 60 is positioned outside the oil seal 43 and the assistant roller bearing 44 of the bearing assembly 40. The rear cover oil seal 63 is disposed on the inner side of the bottom of the rear cover 62. The shell member 61 is located outside for an accommodation of all the abovementioned assemblies and used for fixing the motor-cooling seat 55 of the direct drive torque motor 50.

The position-sensing assembly 70 is fixed on the rear cover 62 of the body 60 and used to sense the changes of the rotating position of the main shaft 20.

The adjustment nut 80 is screwed on the external thread segment 25 of the main shaft 20 and located in the rear cover oil seal 63 of the body 60. Moreover, the nut 80 serves to press tightly against the assistant roller bearing 44 of the bearing assembly 40. The nut 80 is a conventional anti-loose structure, so its further explanation is omitted here.

The aforementioned is the summary of the positional and structural relationship of the respective components of the preferred embodiment in accordance with the present invention.

For a better understanding of the present invention, its operation and function, reference should be made to the descriptions as follows:

Since the outer surface of the main shaft 20 includes the first stage 21, the second stage 22, the third stage 23, the fourth stage 24 and the external thread segment 25 that are successively tapered from one end to the other end of the main shaft 20, and the external thread segment 25 is formed at one end of the main shaft 20. The bearing assembly 40 positions the brake assembly 30, the direct drive torque motor 50, and the body 60 on the respective stages of the main shaft 20. And finally, the adjustment nut 80 is screwed on the external thread segment 25 of the main shaft 20 and serves to press tightly against the assistant roller bearing 44 of the bearing assembly 40.

When it needs to increase the prestress of the main shaft 20, the adjustment nut 80 can be rotated forward to press against the assistant roller bearing 44, and the tapered roller design of the assistant roller bearing 44 can play the role of adjusting the prestress of the main shaft 20, and the respective components on the main shaft 20 will be pulled tight in an opposite direction to increase the rotation friction. When the prestress is adjusted, the adjustment nut 80 will be fixed to prevent loosening.

It is to be noted that, as shown in FIG. 4, after the present invention is operated for a certain period of time, clearances A (also called backlash) will appear between the main shaft 20 and the respective components, the user can rotate the adjustment nut 80 forward to press against the assistant roller bearing 44, and the tapered roller design of the assistant roller bearing 44 can play the role of eliminating the clearance (or backlash) of the main shaft 20. As shown in FIG. 5, pressing the assistant roller bearing 44 again with the adjustment nut 80 and using the respective stages of the main shaft 20 to push tightly against the respective components can effectively eliminate the clearance A (or backlash).

It is noted that the end of the adjustment nut 80 can be designed with conventional anti-loose structures, such as buffer, inserting pin, and so on. And the anti-loose structure is of a conventional technique, so its further explanation is omitted here.

Further, the first oil seal 41, the main bearing 42, the second oil seal 43 and the assistant roller bearing 44 of the bearing assembly 40 are designed to cooperate with the body 60, the position-sensing assembly 70, the direct drive torque motor 50 and the brake assembly 30. The number, type and position of the bearings are not the key point and can be varied according to needs.

To summarize, the clearance eliminating structure for a shaft of a direct drive torque motor comprises: the body, the direct drive torque motor, the bearing assembly and the adjustment nut.

The main shaft includes a plurality of stages which are used to positioning the torque motor and the bearing assembly, and then torque motor and the bearing assembly are used to position the body. The main shaft is formed at the end with threads for enabling the adjustment nut to press tightly against the respective components on the main shaft.

By such arrangements, when the present invention is used on the assembly of the direct drive torque motor, which can not only simplify the assembly operation, improve the reliability, but also eliminate the clearance of the main shaft to increase the service life of the product.

While we have shown and described various embodiments in accordance with the present invention, it is clear to those skilled in the art that farther embodiments may be made without departing from the scope of the present invention.

What is claimed is:

1. A main shaft clearance eliminating structure for a direct drive torque motor, comprising:
a body;
a direct drive torque motor mounted in the body;
a main shaft disposed in the direct drive torque motor, and one end of the main shaft being defined with an external thread segment;
a bearing assembly disposed between the main shaft, the direct drive torque motor and the body, the bearing assembly including an assistant roller bearing pressed between the body and the main shaft; and
an adjustment nut screwed on the external thread segment of the main shaft for pressing tightly against the assistant roller bearing of the bearing assembly.

2. The main shaft clearance eliminating structure for a direct drive torque motor as claimed in claim 1, wherein the assistant roller bearing is a tapered roller bearing.

3. The main shaft clearance eliminating structure for a direct drive torque motor as claimed in claim 1, wherein an outer surface of the main shaft is formed with plural stages that are successively tapered from one end to the other end of the main shaft for pressing tightly against the body, the direct drive motor and the bearing assembly.

4. The main shaft clearance eliminating structure for a direct drive torque motor as claimed in claim 3, wherein the outer surface of the main shaft is formed with a first stage, a second stage, a third stage, a fourth stage and the external thread segment that are successively tapered from one end to the other end of the main shaft;
a brake assembly has an inner side positioned against the first stage of the main shaft, and an outer side of the brake assembly is formed with a positioning portion;
the bearing assembly further includes a first oil seal, a main bearing, a second oil seal, the first oil seal is disposed between the brake assembly and the main shaft, the main bearing is located on the second stage of the main shaft and pressed against the brake assembly, the second oil seal is located on the third stage of the main shaft, the assistant roller bearing is located on the fourth stage and abuts against second oil seal;
the direct drive torque motor includes a mover-fixing seat, a mover oil seal, a mover, a stator and a motor-cooling seat, the mover-fixing seat is positioned against one side of the main shaft of the bearing assembly, the mover oil seal and the mover are fixed outside the mover-fixing seat, the stator is installed in the motor-cooling seat;
the body further includes a shell member, a rear cover and a rear cover oil seal, one end of the body is fixed with the positioning portion of the brake assembly, the body and the main shaft are positioned by the bearing assembly, the rear cover of the body is located outside the second oil seal and the assistant roller bearing of the bearing assembly, an inner inside of a bottom of the rear cover is disposed with the rear cover oil seal, the shell member is located outside for an accommodation of all the above-mentioned components and used for fixing the motor-cooling seat of the direct drive torque motor;
the position-sensing element is fixed on the rear cover of the body and used for sensing rotating position of the main shaft.

5. The main shaft clearance eliminating structure for a direct drive torque motor as claimed in claim 1, wherein the adjustment nut is provided with an anti-loose structure.

* * * * *